Patented Sept. 22, 1953

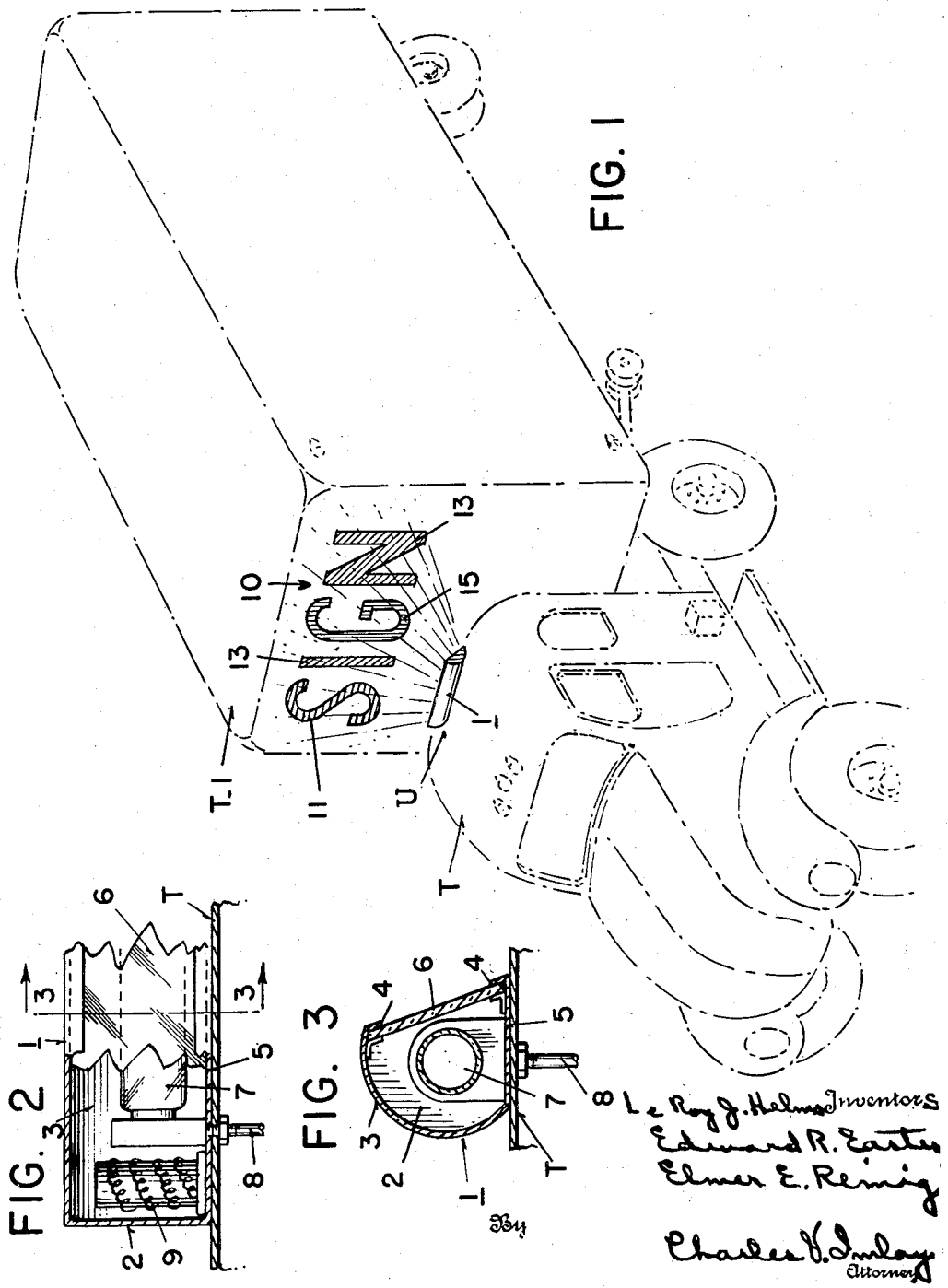

2,652,650

UNITED STATES PATENT OFFICE 2,652,650

APPARATUS FOR DISPLAYING SIGNS

Leroy J. Helms, Baltimore, Edward R. Easter, Anne Arundel County, and Elmer E. Reinig, Baltimore, Md., assignors to The Fluorescent Electric Manufacturing Company, a corporation of Maryland Application August 7, 1947, Serial No. 766,982

1 Claim. (Cl. 40—129)

Our invention consists in a new and useful improvement in apparatus for displaying a sign and is designed more particularly to provide an apparatus for displaying such signs on trailer trucks. Essentially our invention provides on the wall of the trailer areas delineating indicia comprising the desired sign, which areas are treated with fluorescent pigments, and providing on the tractor removably attached to the trailer for towage thereof an activating unit whereby said areas are excited to fluorescence by invisible ultra-violet rays. The particularly novel and useful feature of our improved signs is the use of a single activating unit on the tractor for successively exciting the fluorescent pigments of signs on a plurality of trailers as they are respectively coupled to the tractor for travel.

While we have illustrated in the drawing filed herewith and have hereinafter fully described one specific embodiment of our invention, it is to be distinctly understood that we do not consider our invention to be limited to said specific embodiment but refer for its scope to the claim appended hereto.

In the drawing:

Fig. 1 is a perspective view of the activating unit and the fluorescent areas on the tractor and trailer, respectively.

Fig. 2 is a front elevation of the activating unit, parts being broken away.

Fig. 3 is a vertical section on the line 3—3 of Fig. 2, in the direction of the arrows.

As illustrated in the drawing, our improved device is applied to a tractor T and a trailer T-1 shown in broken lines in Fig. 1. The activating unit U is suitably disposed on the rear edge of the roof of the cab of the tractor T and comprises a suitable opaque casing 1 having end walls 2 and a bonnet 3 shrouding the side of the casing 1 toward the front of the cab. Co-acting longitudinal grooves 4 are provided at the edges of bonnet 3 and bottom 5 of the casing 1 to receive a suitable filter plate 6 for passing invisible ultra-violet rays. Suitably mounted in the casing 1 there is a suitable mercury lamp 7 to which suitable electric current is supplied from the usual battery on the tractor T through a suitable conduit 8. The casing 1 is provided with a suitable electric heating unit 9 energized by current from the tractor battery.

The treated areas 10 are suitably positioned on the forward wall of the trailer T-1 and at an altitude sufficient to be exposed to observation above the roof the cab of the tractor T when the tractor T and the trailer T-1 are coupled for travel.

Fig. 1 shows an area 11 treated with fluorescent pigment, delineating the letter "S." When the area 11 is illuminated by day light, it is observed as having the color violet. When the area 11 is illuminated by the ultra-violet rays, its fluorescent pigment under excitation of such rays causes the area to appear to have a vivid blue color. In Fig. 1, the areas 13, delineating the letters "I" and "N," treated with the fluorescent pigment, appear apple green in day light. These areas 13, under the ultra-violet rays, appear grass green. In Fig. 1, the area 15, delineating the letter "G," treated with fluorescent pigment, appears brown in day light. The area 15, under the ultra-violet rays, appears a vivid red.

It is obvious that since the fluorescent pigment is applied only to those areas of the front wall of the trailer designed to delineate portions of the sign, only the sign will be visible under excitation of the ultra-violet rays, in darkness.

Having described our invention, what we claim is:

In an apparatus for displaying a sign on a trailer, said trailer being coupled at will to a tractor for being towed thereby, the combination of a sign disposed on the forward end of said trailer at an altitude sufficient to be observed over the top of said towing tractor, when said tractor is coupled to said trailer, for towing same, said sign being delineated by a mass of fluorescent pigments excitable by ultra-violet rays impinging thereon; an electric lamp mounted on the rear of the top of the cab of the tractor, and energized by a source of power on the tractor; and a filter associated with said lamp for passing invisible ultra-violet rays generated by said lamp, said lamp and filter being so disposed that, when said tractor and said trailer are connected for towing, the said rays impinge upon said sign.

LEROY J. HELMS.
EDWARD R. EASTER.
ELMER E. REINIG.

References Cited in the file of this patent

UNITED STATES PATENTS

| Number | Name | Date |
|---|---|---|
| 1,004,503 | Troy | Sept. 26, 1911 |
| 1,436,092 | Heaton | Nov. 21, 1922 |
| 1,446,241 | Armstrong | Feb. 20, 1923 |
| 1,813,491 | Gillard | July 7, 1931 |
| 2,299,331 | Marione | Oct. 20, 1942 |

FOREIGN PATENTS

| Number | Country | Date |
|---|---|---|
| 71,630 | Switzerland | Aug. 17, 1915 |
| 97,551 | Switzerland | Feb. 1, 1923 |